INVENTOR.
R.A. FINDLAY
BY Hudson & Young
ATTORNEYS

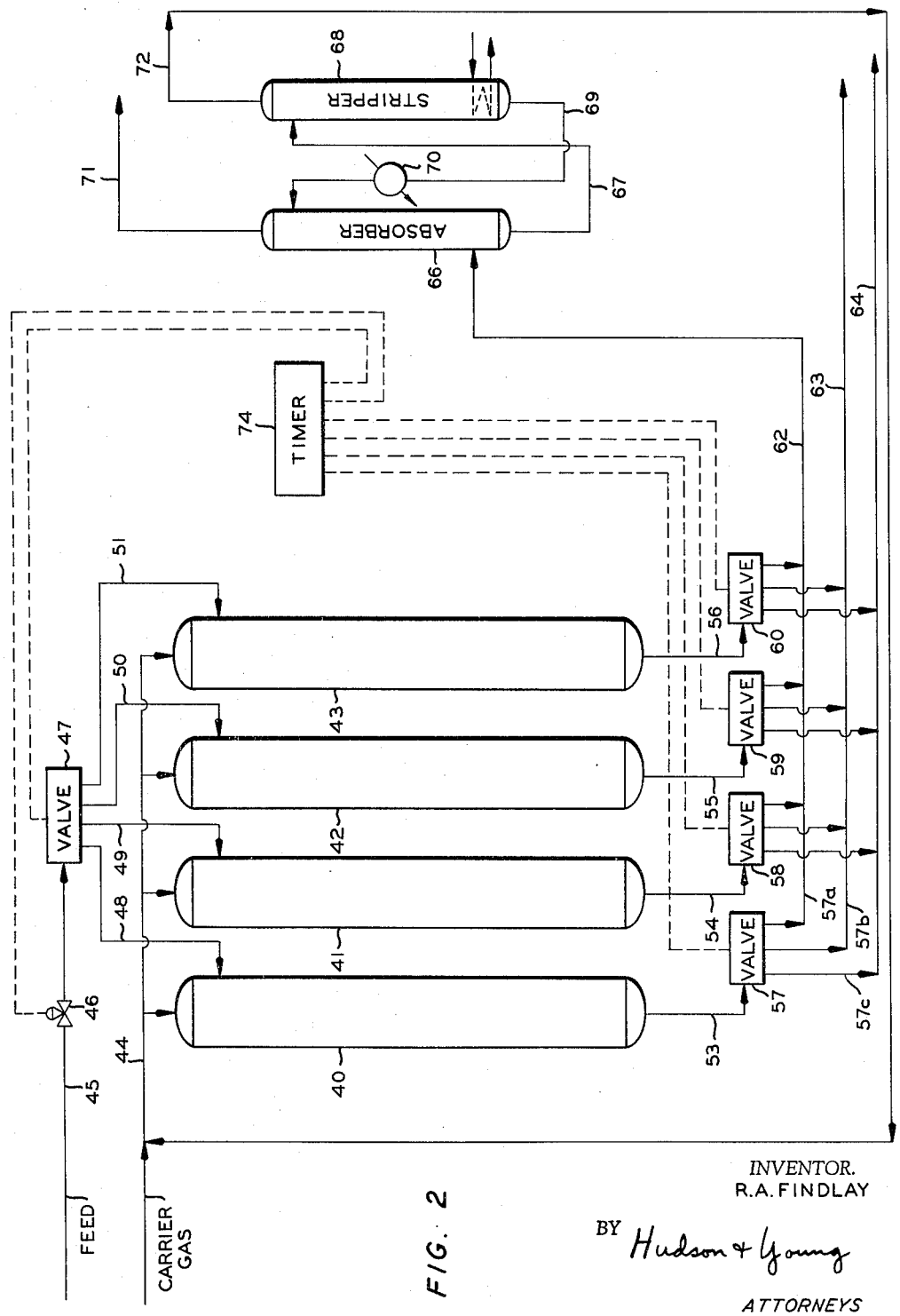

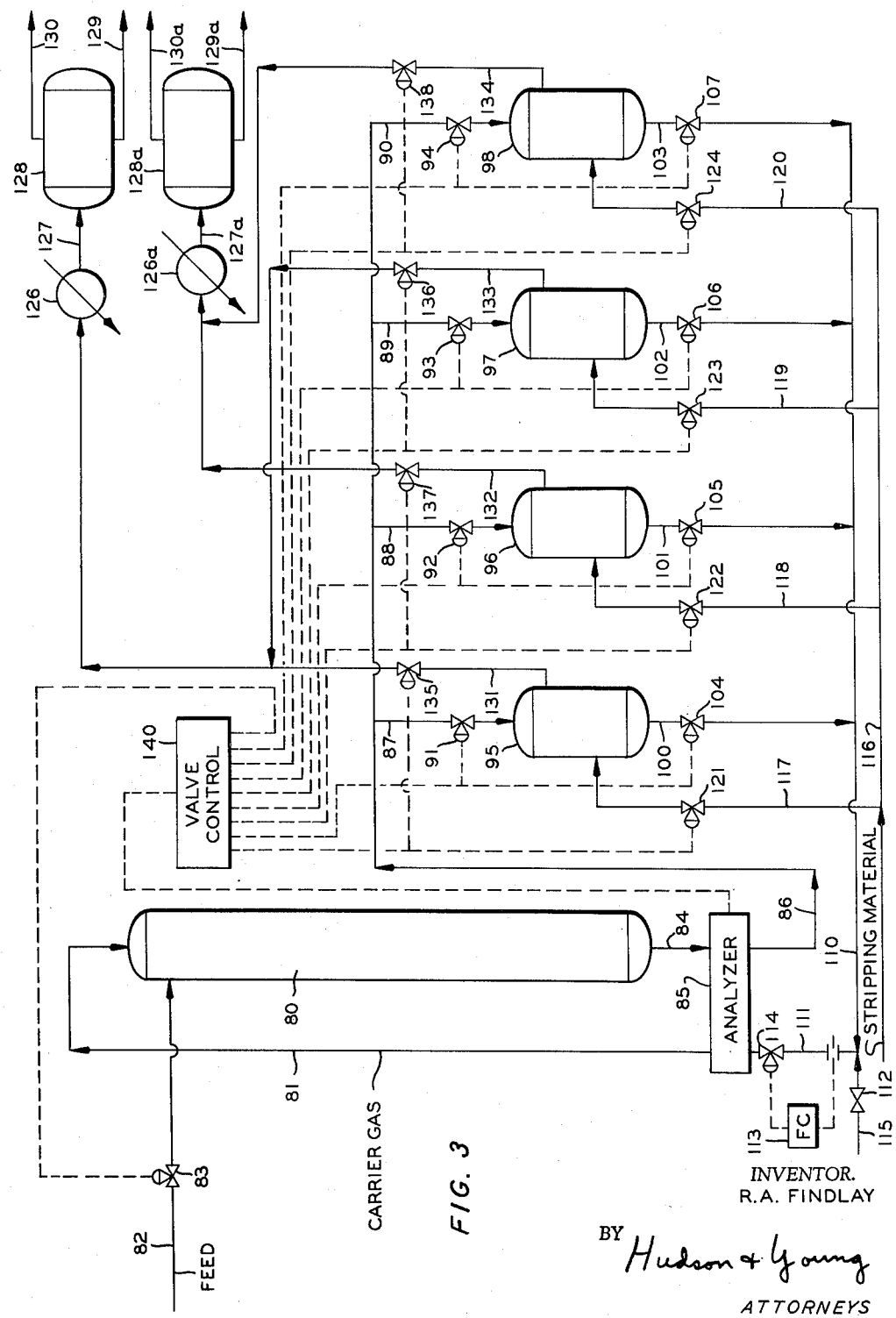

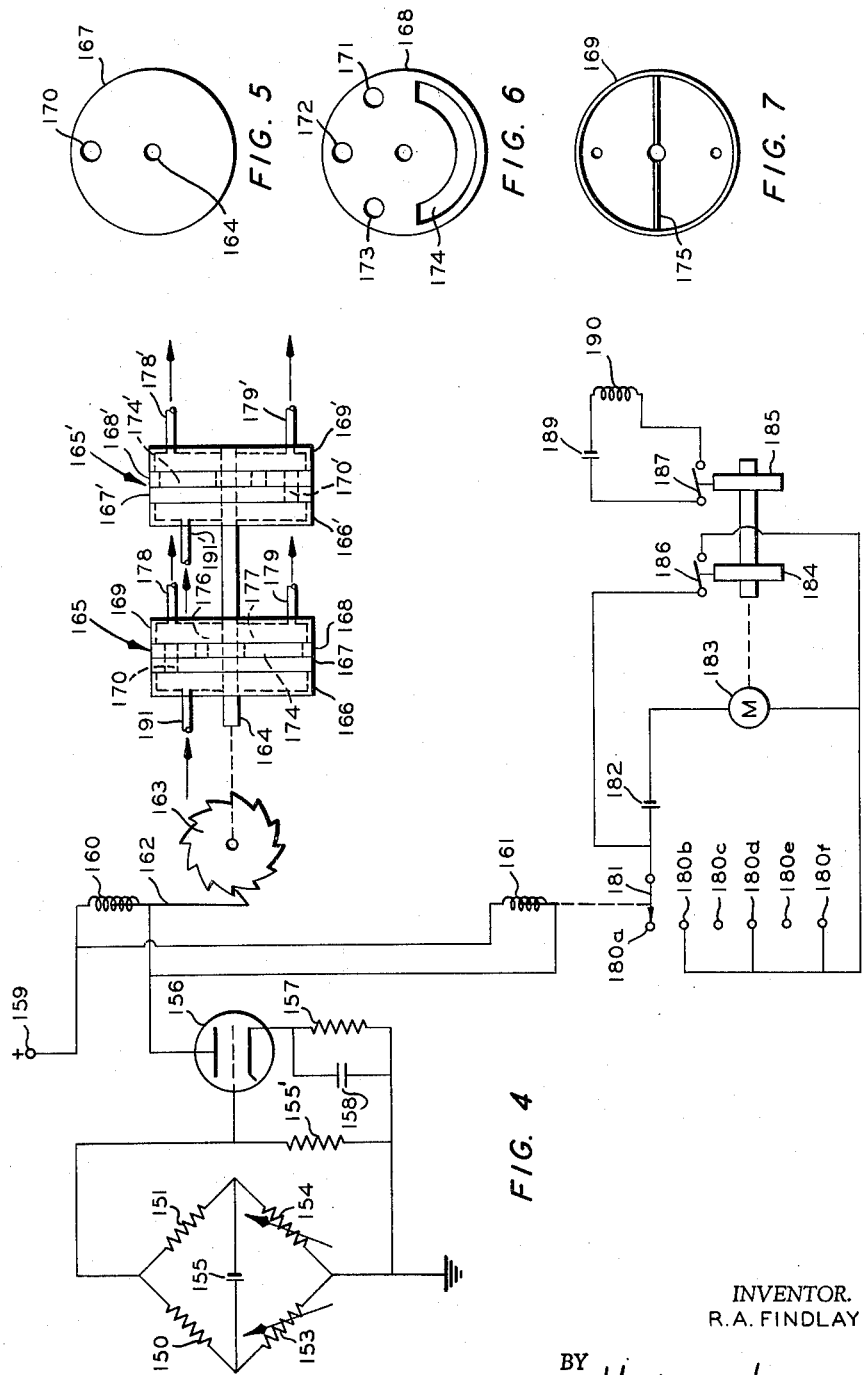

9 United States Patent Office 3,002,583
Patented Oct. 3, 1961

3,002,583
FLUID SEPARATION BY GAS
CHROMATOGRAPHY
Robert A. Findlay, Bartlesville, Okla., assignor to Phillips
Petroleum Company, a corporation of Delaware
Filed June 10, 1957, Ser. No. 664,764
14 Claims. (Cl. 183—2)

This invention relates to the separation of fluid mixtures into their individual constituents.

In various industrial and laboratory procedures, there is a need for high purity materials. In accordance with the present invention, a system is provided for separating a fluid mixture into its individual constituents by means of elution chromatography so as to produce fluids of extremely high purity. In elution chromatography, a sample of the material to be separated is introduced into a column which contains a selective adsorbent. A carrier gas is directed through the column so as to force the sample material through the column. The adsorbent in the column attempts to hold the constituents of the sample, whereas the carrier gas tends to pull them through the column. This results in the several constituents of the fluid mixture traveling through the column at different rates of speed, depending on their affinities for the packing material. The column effluent thus consists initially of the carrier gas alone. The individual constituents of the fluid mixture then appear in the effluent gas at different times. If the sample introduced into the column is less than a predetermined volume, there is no overlapping of the individual constituents in the column effluent. Thus, it is possible to separate a fluid mixture into its individual constituents so as to obtain materials of extremely high purity.

In accordance with the present invention, apparatus employing the principle of elution chromatography is provided for separating fluid mixtures in a rapid and efficient manner. A carrier gas is introduced continually into one or more packed columns. Predetermined volumes of the fluid mixture to be separated are introduced into the column at selected time intervals. The effluent from the column is directed in sequence to a plurality of separating means so as to recover the individual constituents of the fluid mixture from the carrier gas. The carrier gas from the separating means is then recycled to the inlet of the column. The introduction of the feed material and the direction of the effluent in sequence to the plurality of separating means are regulated automatically in a first embodiment of this invention by means of a timer. In a second embodiment of this invention, the flows are regulated in response to an analysis of the effluent gas from the column to detect the presence of the constituents of the fluid mixture being separated.

Accordingly, it is an object of this invention to provide novel apparatus for separating fluid mixtures into their individual constituents by means of elution chromatography.

Another object is to provide a system for separating fluid mixtures to produce high purity products.

Other objects, advantages and features of this invention should become apparent from the following detailed description which is taken in conjunction with the accompanying drawing in which:

FIGURE 2 is a schematic flow diagram of a second embodiment of the apparatus of this invention.

FIGURE 3 is a schematic flow diagram of a third embodiment of the apparatus of this invention.

FIGURE 4 is a schematic representation of the analyzer and valve control mechanism employed in the apparatus of FIGURE 3.

FIGURES 5, 6 and 7 are detailed views of plates employed in the valve control mechanism of FIGURE 4.

Figure 1:
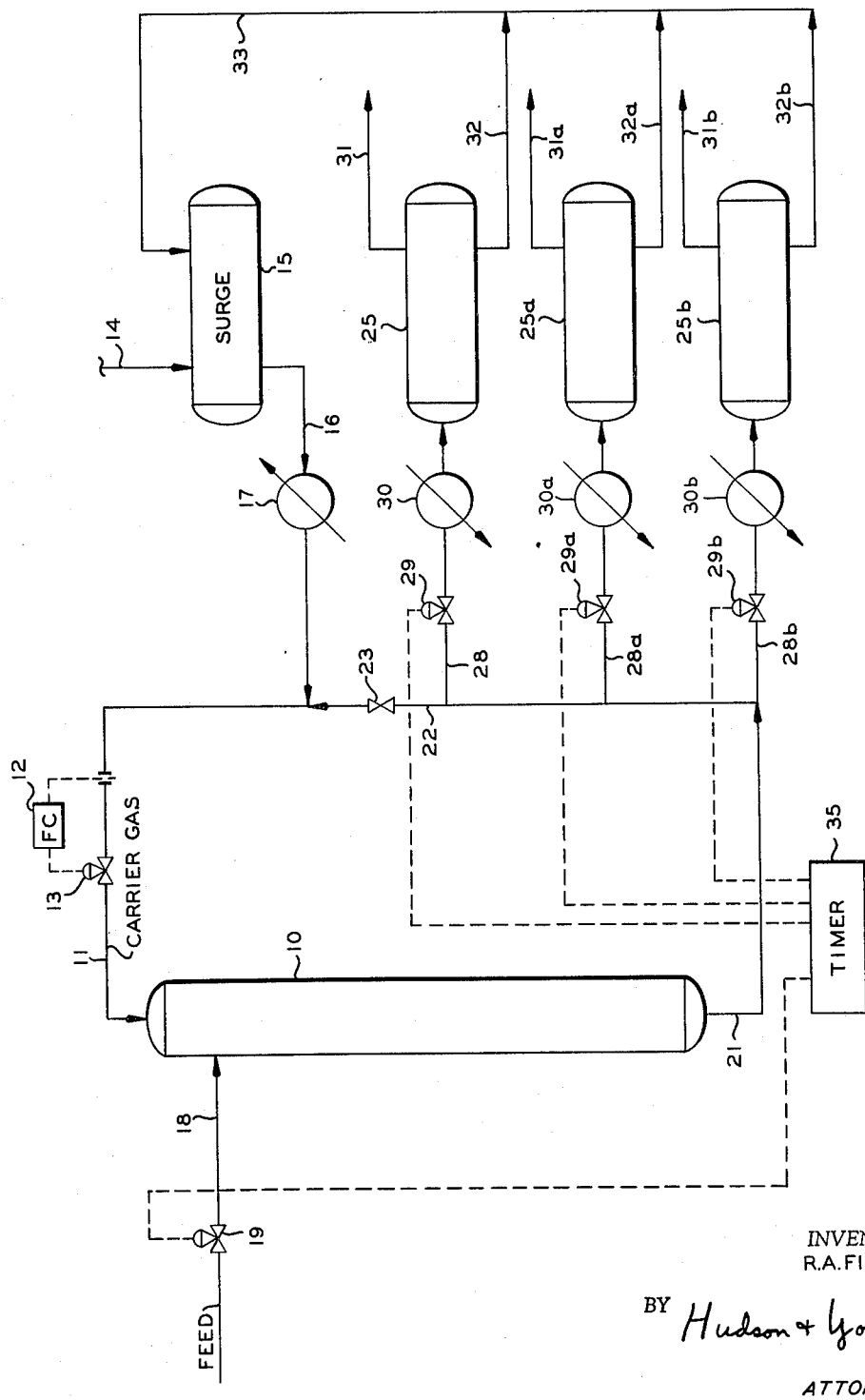
FIGURE 1 is a schematic flow diagram of a first embodiment of the apparatus of this invention.

Referring now to the drawing in detail, and to FIGURE 1 in particular, there is shown an elongated column 10 which is filled with a packing material. A carrier gas is introduced into the top of column 10 by means of a conduit 11. The flow through conduit 11 is maintained at a predetermined rate by means of a flow controller 12 which adjusts a valve 13. The carrier gas, which can be steam in the particular example described hereinafter, is introduced into the system through a conduit 14 which communicates with a surge tank 15. A conduit 16, having a heater 17 therein, communicates between surge tank 15 and inlet conduit 11. The fluid mixture to be separated is introduced into the top of column 10 by means of a conduit 18 which has a valve 19 therein. The effluent from column 10 is withdrawn through a conduit 21. Conduit 21 communicates with conduit 11 through a conduit 22 which has a valve 23 therein. This permits the effluent from column 10 to be recycled through the column.

The separation system of FIGURE 1 is provided with a plurality of phase separation tanks 25, 25a and 25b. A conduit 28, having a valve 29 and a cooler 30 therein, communicates between conduit 21 and tank 25. A conduit 31 communicates with the upper region of tank 25 to remove the vapor phase, and a conduit 32 communicates with the lower region of tank 25 to remove the liquid phase. Corresponding conduits 28a and 28b communicate between conduit 21 and respective tanks 25a and 25b. Conduits 32, 32a and 32b communicate with a conduit 33 which in turn communicates with surge tank 15. The condensed steam is thus recycled to column 10 after being vaporized by heater 17.

Valves 19, 29, 29a and 29b are opened and closed by means of a timer 35. Valve 19 is opened initially for a predetermined time so that a predetermined volume of the fluid mixture to be separated is introduced into column 10. Valve 23 is opened at this time so that the effluent from column 10 is recycled to the inlet of the column. The effluent from column 10 initially consists of carrier gas. At the end of a predetermined time, valve 29 is opened and valve 23 is closed so as to direct the effluent from column 10 through cooler 30 to phase separator 25. This time is selected so that the effluent from column 10 contains the constituent of the fluid mixture which is the least readily absorbed by the packing material in column 10. This constituent is removed from tank 25 through conduit 31, and the condensed steam is recycled to surge tank 15. At a later time, valve 29a is opened and valve 29 is closed. This directs the second constituent of the feed mixture into phase separator 25a. This second constituent is removed through conduit 31a. At a still later time, valve 29b is opened and valve 29a is closed. This directs the third constituent into phase separator 25b, from which it is removed through conduit 31b. The above described operation is then repeated.

As a specific example of the operation of the separation system of FIGURE 1, reference is made to a separation of a fluid mixture containing butene-1, trans-butene-2 and cis-butene-2. Steam at a temperature of 220° F. and at a pressure of 10 p.s.i.g. is employed as the carrier gas. Column 10 has an inside diameter of three inches and is ten feet long. It is packed with pulverized fire brick which has been soaked in dimethyl sulfolane. The steam is directed through column 10 at a rate of approximately 4,000 cubic centimeters per minute. The feed mixture to be separated is introduced into column 10 in discrete volumes of approximately 156 cubic centimeters. One minute after the feed mixture is introduced into column 10, valve 29 is opened to direct the column effluent into separator 25. Valve 23 is closed at this time and there-after remains closed. The effluent directed into separator 25 comprises a mixture of steam and butene-1. This operation continues for one and one-fourth minutes. Valve 29a is then opened and valve 29 is closed to permit the column effluent to pass into separator 25a. The mixture directed to separator 25a comprises steam and trans-butene-2. This operation continues for one and one-fourth minutes. Valve 29b is then opened and valve 29a is closed so that the column effluent is directed into separator 25b. The feed mixture directed to separator 25b comprises steam and cis-butene-2. At the same time valve 29b is opened, valve 19 is again opened to admit a second volume of feed, thereby starting the second cycle. The entire operation then repeats.

It should be evident that additional phase separation tanks can be employed if the fluid mixture contains more than three constituents. The operation of timer 35 can be adjusted for any given feed mixture so that the valves are opened and closed in proper sequence. Timer 35 can be any type of mechanism known to those skilled in the art which is capable of opening and closing valves in sequence. For example, timer 35 can comprise a plurality of cams which are rotated by a constant speed motor. The individual cams are adjusted to open and close switches which control the operation of the valves. These switches can control the application of pneumatic pressures to the valves, for example. It should also be evident that the apparatus of FIGURE 1 has been illustrated schematically in order to simplify the drawing. The various pumps, valves and the like which normally are associated with such a system to provide and regulate the desired flows have been omitted.

In FIGURE 2 there is shown a second embodiment of the fluid separation system. The system of FIGURE 2 comprises a plurality of packed columns 40, 41, 42 and 43. The carrier gas is supplied to the tops of these columns by means of a conduit 44. The feed mixture to be separated is supplied by a conduit 45, which has a valve 46 therein, to the inlet of a selector valve 47. Valve 47 is provided with four outlets which are connected by respective conduits 48, 49, 50 and 51 to the upper regions of respective columns 40, 41, 42 and 43. The outlets of columns 40, 41, 42 and 43 are connected by respective conduits 53, 54, 55 and 56 to the inlets of respective selector valves 57, 58, 59 and 60. Valve 57 is provided with three outlets which are connected by respective conduits 57a, 57b and 57c to respective conduits 62, 63 and 64. Valves 58, 59 and 60 are also provided with three outlets which are connected to conduits 62, 63 and 64 by the indicated connecting conduits. Conduit 62 is connected to the lower region of an absorber column 66. The bottom of column 66 is connected by conduit 67 to the upper region of a stripping column 68. The bottom of column 68 is connected by a conduit 69, which has a cooler 70 therein, to the upper region of absorber 66. A product conduit 71 is connected to the top of absorber 66. A conduit 72 communicates between the top of stripper 68 and carrier gas inlet conduit 44. Valves 46, 47, 57, 58, 59 and 60 are controlled by a timer 74.

The operation of the separation system of FIGURE 2 will be described in conjunction with a specific example wherein the feed mixture to be separated comprises isobutane, normal butane and isobutylene. The carrier gas is carbon dioxide which is supplied at a rate of approximately 4,000 cubic centimeters per minute and at a pressure of 11 pounds per square inch gage. The temperature of the carrier gas is approximately 35° C. Columns 40, 41, 42 and 43 are of the same size as column 10 in FIGURE 1 and contain the same packing material. Valve 47 initially is set so that conduit 45 communicates with conduit 48. Valve 46 is then opened for a sufficient period to pass 156 cubic centimeters of feed mixture to be separated into column 40. Valve 57 is positioned so that conduit 53 communicates with conduit 57a. The effluent from column 40 is thus directed into absorber 66.

The carbon dioxide carrier gas is absorbed by the absorbent supplied through conduit 69, monoethanolamine, for example, and is transferred by conduit 67 to stripper 68. The carbon dioxide is therein stripped from the absorbent and recycled through conduit 72. At the end of approximately four minutes, isobutane appears in the effluent from column 40. This material is recovered through conduit 71. At the end of five minutes, valve 57 is actuated to connect conduit 53 with conduit 57b. The effluent from column 40 is then transferred through conduit 63 to the second absorber-stripper unit, not shown, wherein the normal butane is recovered. At the end of seven minutes, valve 57 is actuated to connect conduit 53 with conduit 57c. The effluent from column 40 is then transferred through conduit 64 to the third absorber-stripper unit, not shown, to recover isobutylene. Also, at the end of four minutes, a second volume of the feed material is introduced into column 40 from conduit 45 by opening valve 46 a predetermined time. This entire operation is repeated every four minutes.

One minute after the first volume of feed is supplied to column 40, valve 47 is actuated so that conduits 45 and 49 are in communication. A sample of feed mixture is then introduced into column 41. This operation is repeated with respect to columns 42 and 43 at the ends of two and three minutes, respectively. Valves 58, 59 and 60 are actuated in the same general time sequence as valve 57, but delayed by one, two and three minutes, respectively, to direct the effluents from respective columns 41, 42 and 43 into the individual separation systems. It should thus be evident that the system of FIGURE 2 operates in substantially a continuous manner, and thereby substantially increases the amount of the feed material that can be separated.

A third embodiment of the fluid mixture separation systems of this invention is illustrated in FIGURE 3. Carrier gas is directed to the top of column 80 by means of a conduit 81. The feed mixture to be separated is introduced into the top of column 80 through a conduit 82 which has a valve 83 therein. The effluent from column 80 is removed through a conduit 84 which communicates with one inlet of an analyzer 85. The corresponding outlet of analyzer 85 communicates with a conduit 86. A plurality of conduits 87, 88, 89 and 90, having respective valves 91, 92, 93 and 94 therein, communicate between conduit 86 and respective containers 95, 96, 97 and 98 which are filled with a material capable of absorbing the constituents of the fluid mixture to be separated, such as charcoal. Conduits 100, 101, 102 and 103, having respective valves 104, 105, 106 and 107 therein, communicate between respective containers 95, 96, 97 and 98 and a common recycle conduit 110. Conduit 110 communicates with a conduit 111 which in turn communicates with the second inlet of analyzer 85. Conduit 81 communicates with the corresponding outlet of analyzer 85. A carrier gas supply conduit 115, having a valve 112 therein, communicates with conduit 111 to supply carrier gas as required. The flow through conduit 111 is maintained at a predetermined rate by a flow controller 113 which adjusts a valve 114.

A stripping material, such as steam, in introduced into the system by means of a conduit 116. Conduits 117, 118, 119, and 120, having respective valves 121, 122, 123 and 124 therein, communicate between conduit 116 and inlets of respective containers 95, 96, 97 and 98. Conduits 131 and 133, having respective valves 135 and 136 therein, communicate between outlets of respective containers 95 and 97 and the inlet of a cooler 126. The outlet of cooler 126 is connected by a conduit 127 to a phase separator 128. Separator 128 is provided with an outlet conduit 129 which removes the condensed material and with an outlet conduit 130 which removes the non-condensed material. Conduits 132 and 134, having respective valves 137 and 138 therein, communicate between outlets of respective containers 96 and 98 and the inlet of a cooler 126a. The outlet of cooler 126a is connected by a conduit 127a to a phase separator 128a.

Analyzer 85 is adapted to provide output signals representative of the presence of the constituents of the fluid mixture to be separated in the effluent from column 80. The output signals from analyzer 85 actuate a valve control unit 140 which in turn opens and closes the several valves in the system.

The operation of the fluid separation system of FIGURE 3 will be described in conjunction with a specific separation of a fluid mixture comprising normal butane and isobutane. Nitrogen is employed as the carrier gas. The operating conditions are otherwise the same as those described in conjunction with FIGURE 2. Valve 83 is opened initially to supply a sample of the feed mixture to column 80. At the end of a certain time, isobutane appears in the effluent from column 80. Analyzer 85 detects the presence of isobutane and transmits a signal to valve control unit 140. Initially, valves 91 and 104 are opened so that the effluent from column 80 passes through container 95 and is recycled to the column. The effluent from column 80 continues to flow through container 95 until normal butane appears in the column effluent. Valves 91 and 104 are then closed and valves 92 and 105 are opened so that the column effluent passes through container 96. At spaced time intervals, additional volumes of the feed mixture are supplied to column 80. When isobutane once again appears in the column effluent, valves 92 and 105 are closed and valves 91 and 104 are opened. This operation continues for a number of cycles so that the adsorbent in container 95 becomes progressively more saturated with isobutane and the adsorbent in container 96 becomes progressively more saturated with normal butane. After a predetermined number of cycles, valves 121, 135, 122 and 137 are opened so that the stripping material passes through containers 95 and 96. Valves 91, 104, 92 and 105 are closed at this time. However, valve control unit 140 then operates the valves associated with containers 97 and 98 so that the effluent from column 80 is alternately passed through these two containers in the same manner as previously described with regard to respective containers 95 and 96. At the end of a predetermined number of these second cycles, containers 97 and 98 are regenerated and the effluent from column 80 is once again passed through containers 95 and 96.

Analyzer 85 and valve control unit 140 are illustrated schematically in FIGURES 4, 5, 6 and 7. The analyzer preferably comprises a thermal conductivity unit which compares the thermal conductivity of the carrier gas supplied to column 80 with the thermal conductivity of the effluent gas from the column. The thermal conductivity unit comprises first and second temperature sensitive elements 150 and 151 which are disposed in the two flows, respectively. Elements 150 and 151 are connected in a Wheatstone bridge network with balancing resistors 153 and 154. A voltage source 155 is connected across first opposite terminals of the bridge network. The junction between elements 150 and 151 is connected through a resistor 155' to the grounded junction between resistors 153 and 154. The junction between elements 150 and 151 is also connected to the control grid of a triode 156. The cathode of triode 156 is connected to ground through a bias resistor 157 which is shunted by a capacitor 158. The anode of triode 156 is connected to a terminal of positive potential 159 through parallel connected solenoids 160 and 161. Each time solenoid 160 is energized, a pin 162 is lifted to rotate a ratchet wheel 163.

Ratchet wheel 163 is connected to a shaft 164 which extends through a pair of pneumatic control units 165 and 165'. Unit 165 comprises a first hollow plate 166 which has a conduit 191 communicating therewith. Conduit 191 supplies air under pressure to the interior of plate 166. A pair of solid plates 167 and 168 are disposed between hollow plates 166 and a second hollow plate 169. Plates 167 and 168 are illustrated in FIGURES 5 and 6. Plate 167 has a single opening 170 therein. Plate 167 is attached to and rotates with shaft 164. Plate 168 is provided with three spaced openings 171, 172 and 173 and with an elongated opening 174. Plate 168 remains stationary, as do plates 166 and 169. Hollow plate 169 is provided with a central barrier 175 which divides the plate into two chambers 176 and 177. Conduits 178 and 179 communicate with respective chambers 176 and 177. Control unit 165' is identical to control unit 165 except that stationary plate 168' is rotated 180° with respect to plate 168.

Valves 121, 104, 91, 135, 122, 137, 123, 106, 136, 93, 124 and 138 are pneumatically operated valves which normally are closed in the absence of pneumatic pressure being applied thereto. Valves 105, 92, 107 and 94 are pneumatically operated valves which normally are open in the absence of pneumatic pressure being applied thereto. Conduit 178 of FIGURE 4 supplies air to actuate valves 104, 91, 105 and 92. Conduit 179 supplies air to actuate valves 121, 135, 122, 137, 105 and 92. Conduit 178' supplies air to actuate valves 123, 136, 124, 138, 107 and 94. Conduit 179' supplies air to actuate valves 106, 93, 107 and 94.

Plate 167 initially is positioned so that opening 170 is between opening 174 and opening 171 of plate 168 of FIGURE 6. The electrical bridge network is initially balanced so that there is no potential difference between ground and the junction between elements 150 and 151. Triode 156 is biased initially so as not to conduct. When isobutane is detected in the effluent from column 80, the bridge network becomes unbalanced so that a positive potential is applied to the control grid of triode 156. This causes the triode to conduct to energize solenoid 160 and thereby rotate ratchet wheel 163 through approximately 30° to move opening 170 into alignment with opening 171 so that pneumatic pressure is applied to chamber 176 and to conduit 178. This pressure closes valves 105 and 92 and opens valves 104 and 91. The opening in plate 167' also moves into alignment with the opening 174' of plate 168' so that valves 123, 136, 124 and 138 are opened and valves 107 and 94 are closed. Each time ratchet wheel 163 is rotated by pin 162, plates 167 and 167' move through approximately 30°. This operation alternately switches the effluent from column 80 to containers 95 and 96. Elongated openings 174 and 174' provide continuous openings of the valves in the regeneration conduits to permit the containers not receiving the effluent from column 80 to be regenerated.

Valve 83 is actuated by means of solenoid 161. This solenoid actuates a stepping switch which is provided with contacts 180a, 180b, 180c, 180d, 180e and 180f. Each time solenoid 161 is energized, a switch arm 181 moves to an adjacent contact. The stepping switch preferably is of the rotary type so that the operation is repetitive. Switch arm 181 is connected to the first terminal of a current source 182. The second terminal of current source 182 is connected to a motor 183. The second terminal of motor 183 is connected to contacts 180b, 180d and 180f. The drive shaft of motor 183 carries a pair of cams 184 and 185 which actuate respective switches 186 and 187. Switch 186 is connected between switch arm 181 and contacts 180b, 180d and 180f. Switch 187 is connected in circuit with a current source 189 and a solenoid 190. Solenoid 190 operates a valve, not shown, which applies pneumatic pressure to valve 83 to cause the latter valve to open.

It should be evident that every second time solenoid 161 is energized, motor 183 is energized by current source 182. Switch 186 is closed immediately by rotation of cam 184 to ensure that rotation of motor 183 continues until cam 184 makes almost one complete revolution. Switch 186 is then opened by the cam to terminate rotation of motor 183, assuming that switch arm 181 is no longer in engagement with one of the contacts 180b, 180d or 180f. Switch 187 is closed by cam 185 for a period of time sufficient to introduce the predetermined volume of fluid mixture into column 80. The feed mixture is thus introduced into the column each time the isobutane is detected in the column effluent. The entire operation is timed so that the isobutane and normal butane appear as discrete masses in the column effluent. It should be evident that various types of carrier gases and packing materials can be employed, depending upon the compositions of the fluid mixtures to be separated. Examples of suitable carrier gases include: helium, hydrogen, nitrogen, argon, air and methane, in addition to steam and carbon dioxide. The packing material can be of the adsorbent type, such as charcoal, alumina, silica gel or a molecular sieve material. Liquid partition columns containing an inert solid coated by a solvent such as hexadecane, octyl sebacate or benzyl ether can also be employed.

While the invention has been described in conjunction with presently preferred embodiments, it should be evident that it is not limited thereto.

What is claimed is:

1. Apparatus for separating a fluid mixture into a plurality of constituents comprising a column filled with a material which selectively retards passage therethrough of the constituents of the fluid mixture to be separated, first means to introduce a carrier gas into one end of said column, second means to introduce a predetermined volume of the fluid mixture to be separated into said one end of the column, a plurality of separating means to separate carrier gas from constituents of the fluid mixture, each of said separating means comprising a container filled with a material which tends to retain said constituents in preference to the carrier gas, means to introduce in sequence the effluent from the second end of said column into first ends of said containers, and means to return the carrier gas effluent from the second ends of said containers to the first end of said column.

2. Apparatus for separating a fluid mixture into a plurality of constituents comprising a column filled with a material which selectively retards passage therethrough of the constituents of the fluid mixture to be separated, first means to introduce a carrier gas into one end of said column, second means to introduce a predetermined volume of the fluid mixture to be separated into said one end of the column, a plurality of separating means to separate carrier gas from constituents of the fluid mixture, means to introduce the effluent from the second end of said column into said separating means in sequence, timing means to control the introduction of the fluid mixture into said column and said means to introduce effluent into said separating means so that said predetermined volumes are introduced into said column in sequence and the individual constituents in the column effluent are introduced into respectively separating means, and means to return the carrier gas from said separating means to the first end of said column.

3. Apparatus for separating a fluid mixture into a plurality of constituents comprising a column filled with a material which selectively retards passage therethrough of the constituents of the fluid mixture to be separated, first means to introduce a carrier gas into one end of said column, second means to introduce predetermined volumes of the fluid mixture to be separated into said one end of the column, a plurality of separating means to separate carrier gas from constituents of the fluid mixture, means to introduce the effluent from the second end of said column into said separating means in sequence, means to detect said constituents in the effluent from said column, means responsive to said means-to-detect to control the introduction of the fluid mixture into said column and said means to introduce effluent into said separating means so that said predetermined volumes are introduced into said column in sequence and the individual constituents in the column effluent are introduced into respective separating means, and means to return the carrier gas from said separating means to the first end of said column.

4. The apparatus of claim 3 wherein each of said separating means comprises a container filled with a material which tends to retain said constituents in preference to the carrier gas, and means to strip the constituents from the material in said container.

5. The apparatus of claim 2 wherein each of said separating means comprises a phase separation container, and means to change the temperature of the effluent from said column to obtain a phase separation in said container.

6. The apparatus of claim 2 wherein each of said separating means comprises an absorber tower, means to introduce the effluent from said column into said tower, and means to introduce a material into said tower which absorbs the carrier gas so that the effluent from the tower comprises one of the constituents to be separated.

7. Apparatus for separating a fluid mixture into a plurality of constituents comprising a plurality of columns filled with material which selectively retards passage therethrough of the constituents of the fluid mixture to be separated, first means to introduce a carrier gas into first ends of said columns, second means to supply a fluid mixture to be separated, first valve means having the inlet thereof connected to said means to supply, said first valve means having a plurality of outlets connected to the first ends of respective ones of said columns, a plurality of separating means to separate carrier gas from constituents of the fluid mixture, a plurality of second valve means having the inlets thereof connected to the second ends of respective ones of said columns, each of said second valve means having a plurality of outlets connected to respective ones of said separating means, and means to actuate said first and second valve means in sequence so that predetermined volumes of the fluid mixture to be separated are passed to said columns in sequence and the effluents from said columns are passed to said separating means so that the same constituents from each column are passed to common separating means.

8. The apparatus of claim 7 wherein said means to actuate said valve means comprises a timer.

9. Apparatus for separating a fluid mixture into a plurality of constituents comprising a column filled with a material which selectively retards passage therethrough of the constituents of the fluid mixture to be separated, first means to introduce a carrier gas into one end of said column, second means to introduce predetermined volumes of the fluid mixture to be separated into said one end of said column in sequence, a plurality of separating means to separate carrier gas from constituents of the fluid mixture, said separating means comprising containers filled with material which retains the constituents of the fluid mixture to be separated in preference to the carrier gas, means to introduce the effluent from the second end of said column into said separating means in sequence, means to pass a stripping material through said containers at times when the effluent from said column is not being passed therethrough, and means to return the carrier gas effluent from the second ends of said containers to the first end of said column.

10. Apparatus for separating a fluid mixture into a plurality of constituents comprising a column filled with a material which selectively retards passage therethrough of the constituents of the fluid mixture to be separated, first means to introduce a carrier gas into one end of said column, second means to introduce predetermined volumes of the fluid mixture to be separated into said one end of said column in sequence, two groups of containers filled with material which retains the constituents of the fluid mixture to be separated in preference to the carrier gas, each group having as many containers as there are constituents to be separated from the fluid mixture, means to introduce the effluent from the second end of said column into said groups in sequence and to each container in each of said groups in sequence and repetitively, means to pass a stripping material through the containers in the group not receiving the column effluent, and means to return the carrier gas effluent from the second ends of said containers to the first end of said column.

11. The apparatus of claim 9 wherein both of said means to introduce and said means to pass the column effluent are actuated by a detector comprising means to compare the thermal conductivities of the carrier gas passed to the column and the effluent therefrom.

12. The method of separating fluid mixtures which comprises passing a carrier gas through a zone which selectively retards passage of the constituents of the fluid mixture to be separated, introducing in sequence predetermined volumes of the mixture to be separated into said zone to be carried through by said carrier gas, directing the effluent from said zone to a plurality of separating zones in sequence to recover the constituents to be separated from the carrier gas, and returning the separated carrier gas to the first-mentioned zone.

13. The method of separating a fluid mixture which comprises passing a carrier gas through a zone which selectively retards passage of the constituents of the fluid mixture to be separated, while passing said carrier gas through said zone introducing in timed sequence predetermined volumes of the mixture to be separated into said zone thus carrying a component of said mixture through said zone by means of said carrier gas, directing the effluent from said zone to each of a plurality of separating zones in timed sequence, separating and recovering therein the constituents to be separated from the carrier gas, and returning the separated carrier gas to the first-mentioned zone.

14. The method of separating a fluid mixture which comprises passing a carrier gas through a zone which selectively retards passage of the constituents of the fluid mixture to be separated; while passing said carrier gas through said zone periodically introducing predetermined volumes of the mixture to be separated into said zone, in response to composition of the effluent of said zone, thus carrying a component of said mixture through said zone by means of said carrier gas; directing the effluent from said zone comprising said carrier gas and said component sequentially to each of a plurality of separating zones said directing being effected responsive to composition of the effluent of said first mentioned zone; separating and recovering therein the constituents to be separated from the carrier gas; and returning the separated carrier gas to the first-mentioned zone.

References Cited in the file of this patent

UNITED STATES PATENTS

| | | |
|---|---|---|
| 2,017,779 | Vosburgh | Oct. 15, 1935 |
| 2,376,425 | Frey | May 22, 1945 |
| 2,800,197 | Wynkoop | July 23, 1957 |
| 2,815,089 | Turner | Dec. 3, 1957 |
| 2,850,114 | Kehde et al. | Sept. 2, 1958 |
| 2,891,630 | Hall et al. | June 23, 1959 |

OTHER REFERENCES

"Gas-Liquid Partition Chromatography" by Lichtenfels et al., Analytical Chemistry, volume 27, No. 10, October 1955, pages 1510–1513.